(12) United States Patent
Bostwick et al.

(10) Patent No.: US 6,894,409 B2
(45) Date of Patent: May 17, 2005

(54) DYNAMOELECTRIC DEVICE AIR FLOW BAFFLE SHAPED TO INCREASE HEAT TRANSFER

(75) Inventors: Peter K. Bostwick, Maryland Heights, MO (US); Patrick M. Jones, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 290 days.

(21) Appl. No.: 09/993,071

(22) Filed: Nov. 13, 2001

(65) Prior Publication Data

US 2003/0090163 A1 May 15, 2003

(51) Int. Cl.[7] .................................................. H02K 9/00
(52) U.S. Cl. ........................................... 310/58; 310/64
(58) Field of Search .............................. 310/58, 62, 64, 310/60 A

(56) References Cited

U.S. PATENT DOCUMENTS

| | | | | |
|---|---|---|---|---|
| 5,563,461 A | * | 10/1996 | Daniels ........................ | 310/71 |
| 5,714,819 A | * | 2/1998 | Gilliland et al. .............. | 310/91 |
| 6,411,000 B1 | * | 6/2002 | Rew ............................ | 310/62 |

* cited by examiner

Primary Examiner—Thomas M. Dougherty
Assistant Examiner—Nguyen N Hanh
(74) Attorney, Agent, or Firm—Thompson Coburn LLP

(57) ABSTRACT

A dynamoelectric device cooling air flow baffle is given a shape that increases its heat transfer and cooling efficiency by providing the baffle with an annular concave surface around its outer perimeter edge that redirects air flow radially inwardly around stator winding end turns while reducing separation of the air flow and also directs the cooling air flow around an inner edge of a center hole of the baffle while reducing separation of the air flow and increasing air flow velocity, thereby efficiently cooling the stator assembly of the dynamoelectric device.

23 Claims, 3 Drawing Sheets

DYNAMOELECTRIC DEVICE AIR FLOW BAFFLE SHAPED TO INCREASE HEAT TRANSFER

BACKGROUND OF THE INVENTION (1) Field of the Invention

The present invention pertains to an air flow baffle used in an dynamoelectric device that has a novel shape that increases air cooling of the device. More specifically, the present invention pertains to an air flow baffle that is positioned in the casing shell of a dynamoelectric device between the stator and a cooling fan of the device, where the air flow baffle directs a flow of cooling air across the dynamoelectric device while reducing flow separations and pressure losses in the air flow and thereby more efficiently cools the dynamoelectric device.

(2) Description of Related Art

Many dynamoelectric devices such as appliance motors for dishwashers, clothes washers and dryers and whirlpool baths utilize fans mounted on their rotor shafts to provide for air cooling of the stators and rotors of the motors during their operation. Typically, the fan is mounted at one axial end of the device and is shaped to pull or push air through the housing or casing shell of the device across the stator and rotor, thereby cooling the device.

The typical dynamoelectric device, for example a generator or motor, includes a generally cylindrical housing or casing shell with a pair of end shields or end bells mounted to the axially opposite ends of the casing shell. The stator of the device is secured to an interior surface of the shell and the rotor of the device is mounted for rotation on the housing end shields. The cooling fan of the device mounted on the rotor typically has an outer diameter that is dimensioned to be received in the interior of the casing shell or the interior of one of the end shields. Mounting the fan on an end of the rotor shaft with the fan contained in the device prevents objects from contacting the fan blades during operation of the device.

The electrical windings of the stator of a dynamoelectric device typically generate the most heat during operation of the device. To provide efficient cooling of the dynamoelectric device, it is desirable that the air flow drawn through the device or pushed through the device by the fan be directed in close proximity across the stator, and that the rate or velocity of the air flow be maximized. For example, in an electric motor it is desirable to direct a flow of cooling air across the stator windings of the motor, in particular across the winding end turns, and to increase the velocity of the air flow in order to provide the most efficient convective cooling of the stator windings.

In prior art dynamoelectric devices such as electric motors, air flow baffles have been employed to direct a flow of cooling air across the stator of the motor. In one such electric motor design that employs a fan to draw cooling air through the motor, the baffle is typically a flat disk that is positioned between the stator and the fan that draws the cooling air through the motor. Air flow baffles used in electric motors are typically constructed from either stamped steel or molded plastic. The baffle disk has an outer perimeter edge that is secured to the interior of the motor casing shell. The outer perimeter of the baffle is typically provided with a cylindrical rim that engages with the casing shell interior surface. The baffle also has a circular inner edge that surrounds a center hole of the baffle through which the rotor shaft passes. The center opening is dimensioned larger than the rotor shaft of the motor to provide ample clearance for the flow of air from the stator and rotor on one side of the baffle to the fan on the opposite side of the baffle.

On operation of the electric motor, the rotating rotor shaft also rotates the fan. The fan rotation draws a flow of air through the baffle center hole from the portion of the casing shell containing the stator and rotor on one side of the baffle, to the opposite side of the baffle occupied by the rotating fan. The cooling air is drawn through the center of the motor across the rotor and the center of the stator, and is also drawn across the outer perimeter of the stator between the stator and the interior surface of the casing shell. The flow of air drawn across the outer perimeter of the stator is redirected radially inwardly by the baffle toward the baffle center hole. This radially inward flow of air cools the wiring end turns of the stator winding. After passing across the stator wiring end turns, the radially inwardly directed flow of air is then drawn through the baffle center hole to the side of the baffle occupied by the rotating fan. The air is then ejected from the motor casing and/or end shield by the rotation of the fan.

Prior art baffle designs have been found to be disadvantaged in that they employ right angle corners where the outer perimeter rim of the baffle joins the flat baffle disk as well as right angle corners at the inner edge of the baffle surrounding the baffle center hole. The right angle corners have a tendency to cause flow separation of the cooling air drawn through the casing shell, causing an undesirable pressure loss and resulting in lower air flow rates and velocity. By decreasing the flow velocity, the cooling efficiency of the baffle is decreased.

SUMMARY OF THE INVENTION

The air flow baffle of the present invention overcomes disadvantages associated with prior art air flow baffles. The baffle of the invention decreases the potential of separation occurring in the flow of air directed from the outer peripheral edge of the baffle radially inwardly across the disk shape of the baffle, and also reduces the potential of separation occurring in the air flow that is drawn across the disk shape and around the baffle inner edge through the baffle center hole.

The air flow directing baffle of the present invention is basically comprised of a circular disk or plate having an outer perimeter edge and an inner edge surrounding a center hole of the plate, with a rim extending around the outer edge and a lip extending around the inner edge.

The plate is provided with a flat annular surface portion on the surface of the plate that faces the windings/stator of the dynamoelectric device when the baffle is installed in the casing shell of the device. The opposite side of the plate from the device faces the fan that draws cooling air through the device and the plate center hole.

The cylindrical rim around the outer perimeter of the plate has an exterior surface dimensioned to fit tight against the interior surface of the casing shell when the baffle is inserted into the casing shell. The rim has a cylindrical interior surface that merges into the flat annular surface portion of the plate through an annular concave surface. The annular concave surface extends around the connection of the cylindrical rim with the flat, annular interior surface of the plate.

The lip surrounding the inner edge of the plate has a convex surface that projects from the plate toward the stator of the device with the plate installed in the casing shell of the device. The lip convex surface extends completely around the plate center hole. The lip convex surface also extends radially inwardly to the inner edge of the plate and merges continuously with the flat annular surface portion of the plate as it extends radially outwardly. The concave surface of the lip is positioned axially opposite the wiring end turns of the stator when the baffle is installed in the casing shell of the motor.

The baffle of the present invention operates in basically the same manner as prior art baffles in that, on rotation of the rotor shaft and the fan, a flow of cooling air is drawn through and across the rotor and stator on one side of the baffle and through the baffle center hole to the fan on the opposite side of the baffle. However, the flow of air drawn across the outer periphery of the stator toward the baffle is drawn across the annular concave surface of the baffle at the baffle plate outer perimeter. The annular concave surface of the baffle receives the axial flow of air across the outer perimeter of the stator and redirects the flow, radially inwardly between the stator wiring end turns and the flat annular portion of the plate. The curvature of the annular concave surface redirects the flow of air from an axial direction, to a radially inward direction without creating the pressure losses of the air flow that was caused by the right angle connection of the outer cylindrical rim and outer perimeter edges of the baffle plate of the prior art.

The radially inwardly directed flow of air then passes over the convex surface of the lip surrounding the plate center hole and is directed around the lip and through the center hole to the fan on the opposite side of the plate. The convex surface of the lip functions to reduce separation of the air flow around the plate inner edge and the creation of a separation region in the air flow directed through the center hole from that created by the prior art baffle plates that have right angle edges of the baffle plate around the center hole. Reducing/eliminating separation here results in better inlet flow into the fan. In addition, the projection of the lip concave surface from the baffle plate toward the winding end turns of the stator reduces the cross-sectional area of the air flow in the area between the baffle lip and the stator end turns. This reduction in the spacing between the baffle lip and the end turns increases the velocity of the air flow drawn between the baffle plate and stator windings, thereby increasing cooling efficiency.

Thus, by reducing air flow separation and the associated pressure losses and increasing the velocity of air flow between the stator and the baffle and creating better fan inlet flow conditions, the air flow directing baffle of the present invention increases the cooling efficiency of the baffle of the invention over that of prior art baffles.

DESCRIPTION OF THE DRAWING FIGURES

Further features of the present invention will be revealed in the following detailed description of the preferred embodiment of the invention and in the following drawing figures:

FIG. 3 is a side elevation view of the air flow baffle of FIG. 2 sectioned along line 3—3 of FIG. 2.

DETAILED DESCRIPTION OF THE PREFERRED EMBEDMENT

Figure 1:
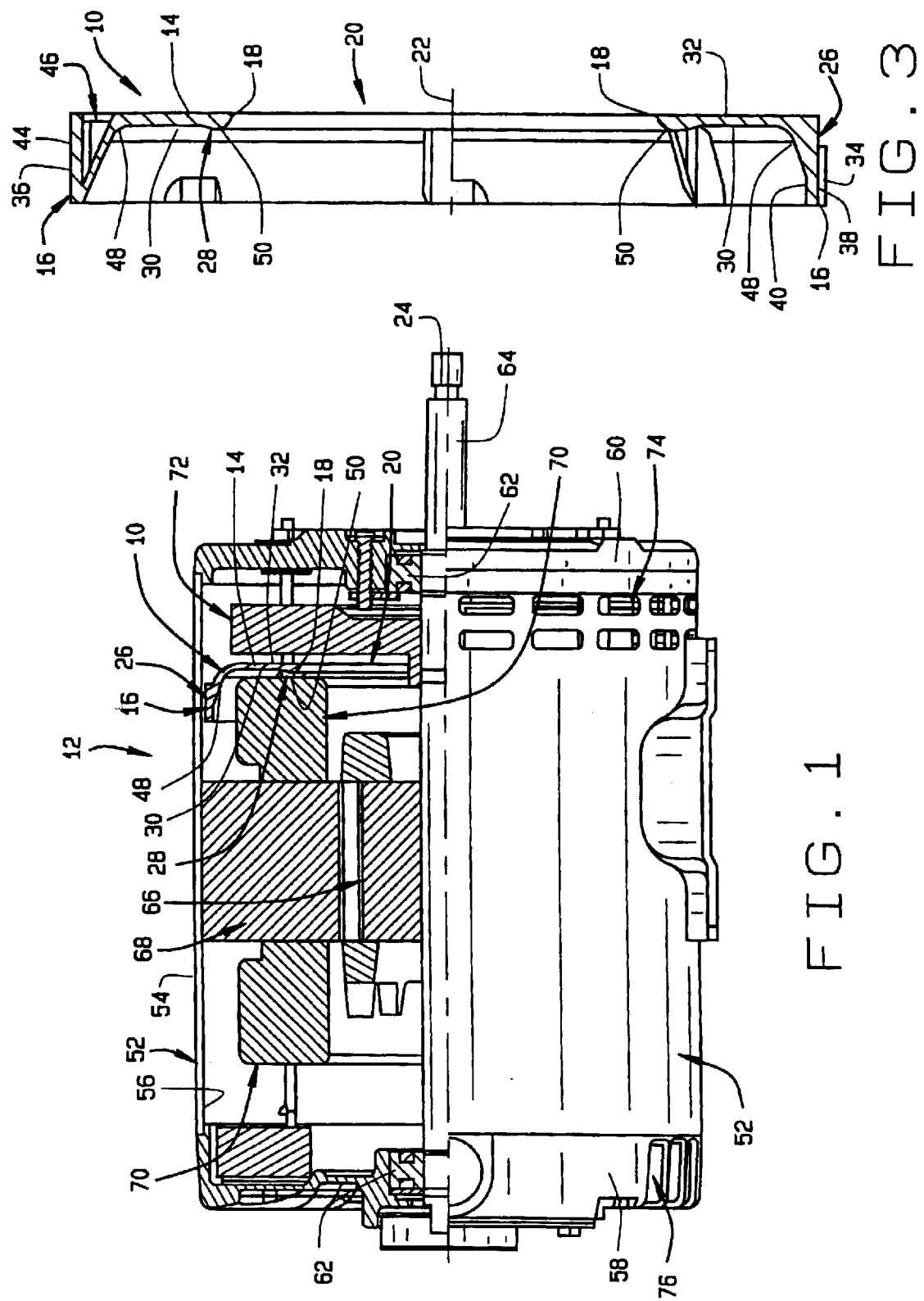
FIG. 1 is a side elevation view, partially in section, of a dynamoelectric device employing the air flow baffle of the present invention.
Figure 2:
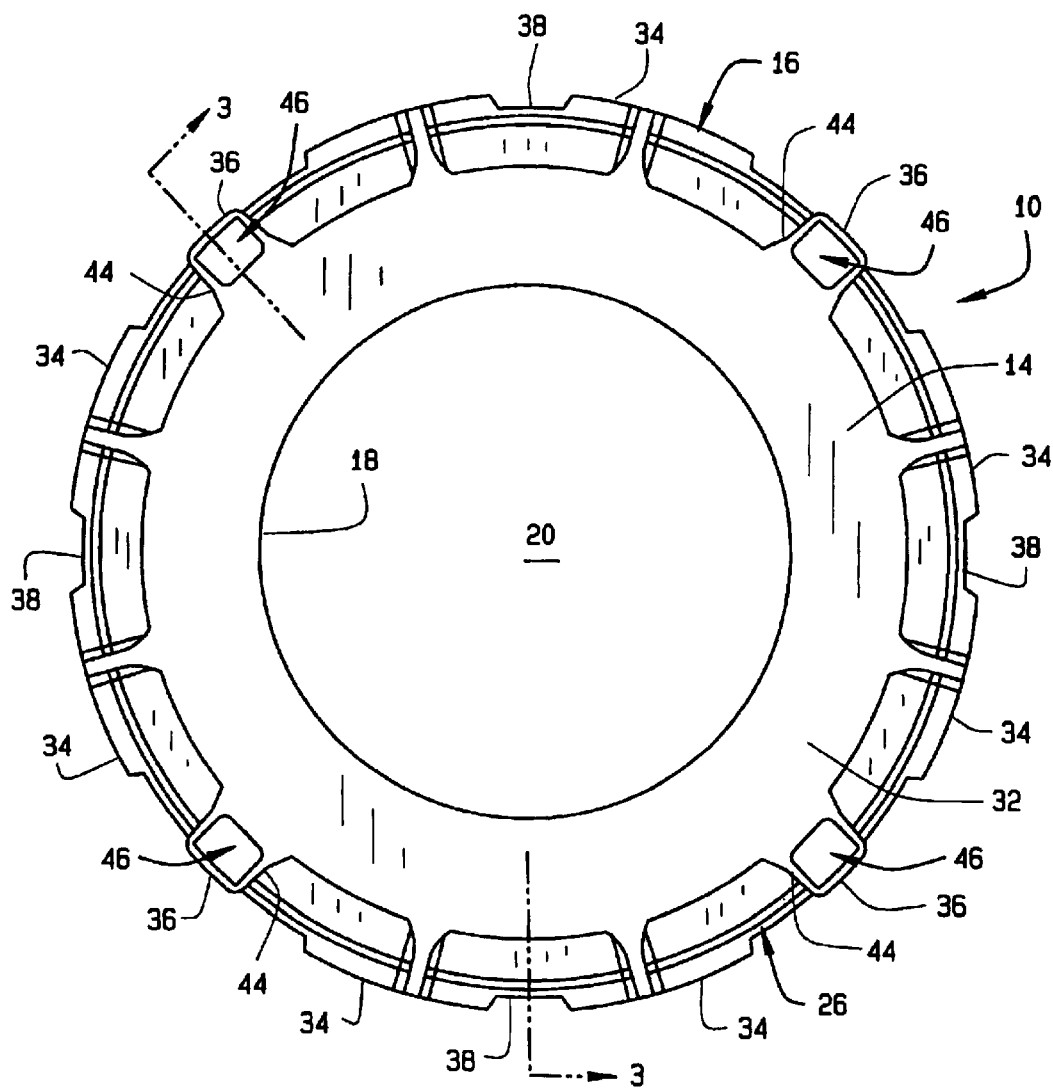
FIG. 2 is a front view of the baffle removed from the dynamoelectric device.
Figure 4:
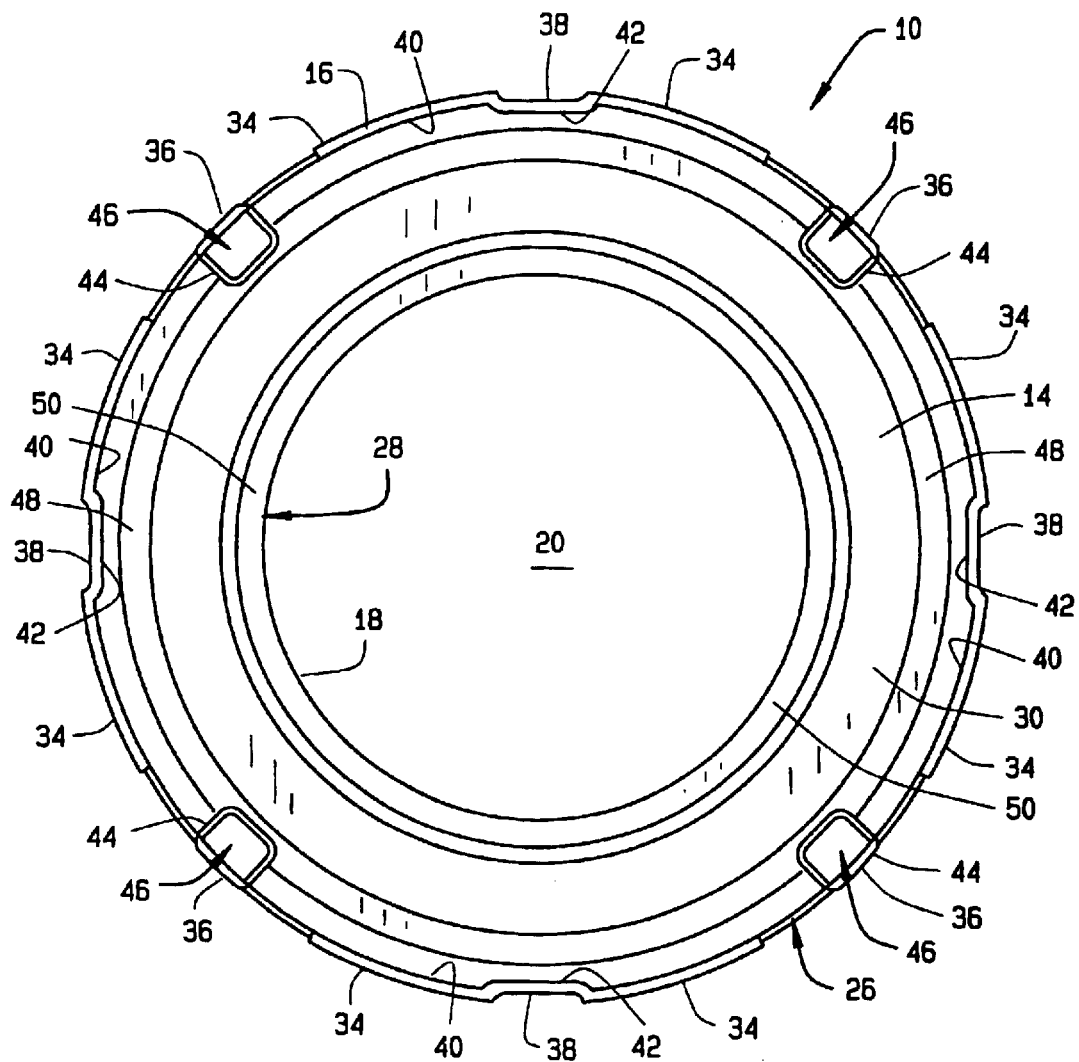
FIG. 4 is an elevation view of the rear, interior surface of the baffle of FIG. 2.

FIG. 1 shows a sectioned view of the air flow baffle 10 of the present invention employed in an electric motor 12 dynamoelectric device. FIGS. 2 to 4 show the baffle 10 removed from the device. Although the baffle 10 is to be described in use in an electric motor dynamoelectric device, it should be understood that the baffle is equally well suited for use in other dynamoelectric devices. It is not intended that the description of the baffle with an electric motor limit the scope of protection for the baffle to only use in an electric motor dynamoelectric device.

The air baffle 10 of the invention can be stamped from metal, molded of plastic, or manufactured by other equivalent methods and of other equivalent materials. The baffle 10 is basically a circular disk or plate 14 having a circular outer perimeter edge 16 and a circular inner edge 18 surrounding a center hole 20 of the baffle. The center hole 20 has a center axis 22 that is co-axial with a center axis 24 of the electric motor 12 when the baffle 10 is installed in the motor. A cylindrical rim 26 is provided on the plate 14 extending around the plate outer perimeter edge 16. An annular lip 28 is also provided on the plate 14 extending around the plate center hole 20.

The plate 14 has a flat, annular surface portion 30 on an interior side of the plate that faces toward the dynamoelectric device when the baffle 10 is installed in the device. As best seen in FIG. 4, the flat, annular surface portion 30 extends continuously around the center hole 20 of the plate. The plate 14 also has a flat, annular surface portion 32 on the exterior side of the plate 14 that faces away from the dynamoelectric device when the baffle 10 is installed in the device. As best seen in FIG. 2, the flat, annular exterior surface 32 extends continuously around the plate center hole 20. In variant embodiments of the invention, the plate exterior surface 32 could be given different configurations to enhance the ability of the fan of the dynamoelectric device to draw air through the device.

In the preferred embodiment of the invention, the cylindrical rim 26 is an integral part of the baffle plate 14. The cylindrical rim extends completely around the outer perimeter of the plate 14 and, as best seen in FIGS. 2 and 4, has a plurality of arcuate exterior surface portions 34, 36 that project radially outwardly from the rim. The exterior surface of the rim also includes recessed arcuate surface portions 38 that alternate with the projecting surface portions 34, 36. The outer circumference of the rim defined by the projecting exterior surface portions 34, 36 is dimensioned to provide a tight fit against the interior surface of the casing shell of the dynamoelectric device when the baffle is inserted into the device. This eliminates the need for fasteners to attach the baffle to the casing shell. The rim has a cylindrical interior surface 40 opposite its exterior surface. The cylindrical interior surface 40 is interrupted by several inwardly directed projecting surfaces 42 that are opposite some of the exterior surface recessed sections 38 and several hollow columns 44 that extend axially through the baffle.

The hollow columns 44 are spacially arranged around the perimeter edge 16 of the baffle. As shown in FIGS. 2 and 4, each of the columns has a rectangular cross-section defined by a tubular outer wall of the column that surrounds a hollow interior 46 of the column. The column hollow interiors 46 pass completely through the baffle and are provided to accommodate threaded fasteners that hold together component parts of the dynamoelectric device with which the baffle is used.

As best seen in FIGS. 1, 3 and 4, the rim interior surface 40 merges into the flat, annular surface portion 30 of the baffle interior surface through an annular concave surface 48. As best seen in FIG. 3, the rim interior surface 40 merges continuously with the plate annular interior surface 30 through the annular concave surface 48. The annular concave surface 48 extends around the connection of the cylindrical rim 26 with the flat, annular surface 30 of the plate interior surface. The annular concave surface 48 extends continuously around the plate 14 and is only partially interrupted by portions of the hollow columns 44 that pass through the concave surface.

The annular lip 28 of the baffle is also formed as an integral part of the plate 14. The lip is formed with a convex surface 50. As seen in FIG. 4, the lip extends continuously around the inner edge 18 of the plate. As seen in FIGS. 1 and 3, the lip convex surface 50 projects outwardly from the flat, annular inner surface 30 of the plate toward the dynamoelectric device 12 with the baffle 10 installed in the device. The annular convex surface 50 extends continuously to the inner peripheral edge 18 of the plate. The annular convex surface 50 also extends radially outwardly and merges continuously with the flat, annular interior surface 30 of the plate.

As stated earlier, FIG. 1 shows the baffle 10 of the invention employed in an electric motor dynamoelectric device 12. The device includes a cylindrical casing shell 52 having an exterior surface 54 and an opposite interior surface 56. The shell has openings at its axially opposite ends and a first end bell or end shield 58 is secured to the shell at one end and a second end bell or end shield 60 is secured to the shell at the opposite end. Bearings 62 are mounted in the device end shields 68, 60 and support a rotor shaft 64 for rotation. A rotor 66 is mounted on the rotor shaft 64 and a stator assembly 68 is mounted to the interior surface 56 of the casing shell around the rotor. Wiring end turns 70 of the stator assembly 68 are schematically represented in FIG. 1 at axially opposite ends of the stator. A fan 72 is also mounted to the rotor shaft 64 adjacent the second end shield 60. The fan 72 in the illustrative embodiment of the baffle 10 shown in FIG. 1 is a radial fan of a type known in the prior art. Radial fans function by creating a vacuum pressure at the center of the fan by the blades of the fan pushing air radially outwardly on rotation of the fan about its center axis. With the fan 72 shown in the illustrated embodiment of FIG. 1 being a radial fan, the motor casing shell 52 is provided with a plurality of air flow exit openings 74 around the circumference of the shell adjacent the second end shield 60. On rotation of the fan 72 by operation of the motor 12, air is drawn through the motor casing shell 52 toward the center of the fan 72 and then is pushed radially outwardly by the fan through the air flow openings 74 in the casing shell.

The baffle 10 of the invention is shown assembled in the dynamoelectric device 12 between the stator assembly 68 and the fan 72. The baffle interior surface 30 faces toward the stator assembly 68 and its opposite exterior surface 32 faces toward the fan 72. In the preferred embodiment, the outer circumferential dimension defined by the radially projecting exterior surface portions 34 of the baffle rim are dimensioned to fit against the casing shell interior surface 56 in a tight fit, eliminating the need for fasteners to secure the baffle 10 to the casing shell 52. The baffle 10 is positioned circumferentially relative to the motor so that the motor fasteners (not shown) will pass through the hollow columns 44 of the baffle. The baffle 10 is also positioned axially in the casing shell 52 so that the axially projecting annular convex surface 50 of the baffle lip is positioned in close proximity to the stator assembly wiring end turns 70 while being spaced from the end turns. It can also be seen in FIG. 1 that the inner edge 18 of the baffle plate 14 is dimensioned so that the center hole 20 defined by the inner edge is larger than the center bore of the stator assembly 68, providing ample clearance between the plate inner edge 18 and the rotor core 66 for the passage of the rotor assembly therethrough.

The baffle 10 operates in basically the same manner as prior art baffles in that, on operation of the motor 12 and rotation of the fan 72, a flow of cooling air is drawn through the motor 12 from air inlet openings 76 in the first end shield 58, through the casing shell 52 and through the baffle center hole 20 to the fan 72. The fan then pushes the cooling air radially outwardly through the shell air flow exit openings 74. The flow of cooling air drawn through the motor flows across the rotor 64 through the stator center bore and across the outer periphery of the stator assembly 68 toward the baffle 10. A portion of the cooling air flow drawn across the outer periphery of the stator assembly 68 toward the baffle 10 is drawn into and across the cylindrical rim interior surface 40 and across the annular concave surface 48 of the rim. The annular concave surface 48 of the baffle receives the axial flow of air across the outer periphery of the stator assembly and redirects the flow of air radially inwardly between the stator wiring end turns 70 and the flat, annular interior surface portion 30 of the baffle plate 14. The curvature of the annular concave surface 48 redirects the flow of air from an axial direction to a radially inward direction without causing pressure losses that were caused by the right angle connection of the outer cylindrical rim to the baffle plate of the prior art.

The radially inwardly directed flow of air then passes across the flat, annular interior surface portion 30 of the plate 14 and over the annular convex surface 50 of the lip 28 surrounding the plate center hole 20. The smooth convex surface 50 of the annular lip 28 extending from the flat, annular interior surface portion 30 of the plate 14 to the plate inner edge 18 directs the flow of air around the lip 28 and through the center hole 20 to the fan 72 on the opposite side of the plate 14. The lip convex surface 50 functions to reduce separation of the air flow as the flow passes around the lip 28 to the plate inner edge 18 and thereby avoids pressure losses in the air flow directed through the center hole and results in better inlet flow conditions to the fan. In addition, the axial projection of the lip concave surface 50 from the baffle plate interior surface 30 toward the stator winding end turns 70 reduces the cross sectional area of the air flow in the area between the baffle lip 28 and the stator end turns 70 as seen in FIG. 1. This reduction in the axial spacing between the baffle lip 28 and the end turns 70 increases the velocity of the air flow drawn between the lip and stator windings, thereby increasing cooling efficiency of the winding end turns 72.

Thus, by reducing air flow separation and pressure losses and increasing the velocity of air flow between the stator assembly 68 and the baffle 10, the air flow directing baffle 10 of the present invention increases the cooling efficiency of the baffle over that of prior art baffles.

While the present invention has been described by reference to a specific embodiment, it should be understood that modifications and variations of the invention may be constructed without departing form the scope of the invention defined in the following claims.

What is claimed:

1. An air flow directing baffle that is inserted into a casing shell of an air cooled dynamoelectric device to direct a flow of cooling air across the dynamoelectric device, the baffle comprising:

a plate having opposite sides with an interior surface on one side of the plate that faces toward the dynamoelectric device when the baffle is installed in the casing shells, and an opposite exterior surface on an opposite side of the plate, a center hole with a center axis passing through the plate, an inner edge of the plate extending around the center hole and an outer edge of the plate extending around an outer perimeter of the plate, and an annular lip that extends around the center hole and projects axially outwardly from the interior surface on the one side of the plate.

2. The baffle of claim 1, further comprising:

a cylindrical rim extending around the outer edge of the plate and the rim being dimensioned for a tight fit to the casing shell when the baffle is inserted into the casing shell.

3. An air flow directing baffle that is inserted into a casing shell of an air cooled dynamoelectric device to direct a flow of cooling air across the dynamoelectric device, the baffle comprising:

a plate having an interior surface that faces toward the dynamoelectric device when the baffle is installed in the casing shell, and an opposite exterior surface, a center hole with a center axis passing through the plate, an inner edge of the plate extending around the center hole and an outer edge of the plate extending around an outer perimeter of the plate, and an annular lip that extends around the center hole and projects outwardly from the interior surface, the annular lip having a convex surface.

4. The baffle of claim 3, further comprising:

the convex surface of the lip extending to the inner edge of the plate.

5. The baffle of claim 3, further comprising:

the plate interior surface having a flat, annular portion and the lip convex surface merging as a continuous surface into the flat, annular portion of the plate interior surface.

6. The baffle of claim 3, further comprising:

the convex surface of the lip being spaced from the dynamoelectric device when the baffle is inserted into the casing shell.

7. An air flow directing baffle that is inserted into a casing shell of an air cooled dynamoelectric device to direct a flow of cooling air across the dynamoelectric device, the baffle comprising:

a plate having an interior surface that faces toward the dynamoelectric device when the baffle is installed in the casing shell, and an opposite exterior surface, a center hole with a center axis passing through the plate, an inner edge of the plate extending around the center hole and an outer edge of the plate extending around an outer perimeter of the plate, an annular lip that extends around the center hole and projects outwardly from the interior surface, a cylindrical rim extending around the outer edge of the plate and the rim being dimensioned for a tight fit to the casing shell when the baffle is inserted into the casing shell, the cylindrical rim projecting axially outwardly from the plate interior surface.

8. An air flow directing baffle that is inserted into a casing shell of an air cooled dynamoelectric device to direct a flow of cooling air across the dynamoelectric device, the baffle comprising:

a plate having an interior surface that faces toward the dynamoelectric device when the baffle is installed in the casing shell, and an opposite exterior surface, a center hole with a center axis passing through the plate, an inner edge of the plate extending around the center hole and an outer edge of the plate extending around an outer perimeter of the plate, an annular lip that extends around the center hole and projects outwardly from the interior surface, a cylindrical rim extending around the outer edge of the plate and the rim being dimensioned for a tight fit to the casing shell when the baffle is inserted into the casing shell, the cylindrical rim having an annular concave surface that merges into the plate interior surface.

9. An air cooled dynamoelectric device comprising:

a casing shell having opposite interior and exterior surfaces, a center axis and axially opposite end openings;

a stator secured inside the casing shell with the casing shell interior surface surrounding the stator, the stator having wiring end turns at axially opposite ends of the stator;

a plate secured to the casing shell, the plate having an interior surface that faces toward the stator and an opposite exterior surface, a center hole passing through the plate with an inner edge of the plate extending around the center hole, and an annular lip extending around the center hole and projecting axially outwardly from the plate interior surface toward the stator.

10. The dynamoelectric device of claim 9, further comprising:

the annular lip having a convex surface.

11. The dynamoelectric device of claim 10, further comprising:

the convex surface of the lip extending to the inner edge of the plate.

12. The dynamoelectric device of claim 10, further comprising:

the plate interior surface having a flat, annular portion and the lip convex surface merging as a continuous surface into the flat, annular portion of the plate interior surface.

13. The dynamoelectric device of claim 10, further comprising:

the convex surface of the lip being axially spaced from the stator.

14. The dynamoelectric device of claim 10, further comprising:

the convex surface of the lip being axially opposite and spaced from the stator wiring end turns.

15. The dynamoelectric device of claim 9, further comprising:

a cylindrical rim extending around an outer perimeter of the plate, the cylindrical rim being tight fit against the casing shell interior surface securing the plate to the casing shell.

16. The dynamoelectric device of claim 15, further comprising:

the cylindrical rim projecting axially outwardly from the plate interior surface.

17. The dynamoelectric device of claim 15, further comprising:

the cylindrical rim having an annular concave surface that merges into the plate interior surface.

18. The dynamoelectric device of claim 9, further comprising:

the stator having a center bore through the stator; and, the plate center hole being larger than the stator center bore.

19. The dynamoelectric device of claim 9, further comprising:

the interior surface of the plate having a flat surface portion, and the annular lip projecting outwardly from the flat surface portion of the plate.

20. The dynamoelectric device of claim 19, further comprising:

the annular lip having a convex surface that merges with the flat surface portion of the plate.

21. The dynamoelectric device of claim 9, further comprising:

the annular lip opposing the stator wiring and turns.

22. The dynamoelectric device of claim 9, further comprising:

the stator having a center bore through the stator;

a rotor in the casing in the stator center bore for rotation of the rotor in the stator center bore, the rotor having a shaft projecting from the stator center bore;

a fan mounted on the rotor shaft in the casing for rotation of the fan with the rotor shaft in the casing; and, the fan having an outer periphery that is larger than the plate center hole.

23. The dynamoelectric device of claim 22, further comprising:

the plate exterior surface opposing the fan.

* * * * *